US011712020B2

(12) United States Patent
Vaccari

(10) Patent No.: US 11,712,020 B2
(45) Date of Patent: Aug. 1, 2023

(54) COLLAPSIBLE PET'S CRATE

(71) Applicant: FERPLAST S.P.A., Castelgomberto (IT)

(72) Inventor: Nicola Vaccari, Castelgomberto (IT)

(73) Assignee: FERPLAST S.P.A., Castelgomberto (IT)

( * ) Notice: Subject to any disclaimer, the term of this patent is extended or adjusted under 35 U.S.C. 154(b) by 99 days.

(21) Appl. No.: 17/074,622

(22) Filed: Oct. 19, 2020

(65) Prior Publication Data

US 2021/0112773 A1    Apr. 22, 2021

Related U.S. Application Data

(63) Continuation of application No. PCT/IB2019/061265, filed on Dec. 23, 2019.

(30) Foreign Application Priority Data

Sep. 20, 2019 (IT) .................... 102019000016895

(51) Int. Cl.
  *A01K 1/03* (2006.01)
  *A01K 1/02* (2006.01)
(52) U.S. Cl.
  CPC ............ *A01K 1/032* (2013.01); *A01K 1/0245* (2013.01)
(58) Field of Classification Search
  CPC ........ A01K 1/0245; A01K 1/032; A01K 1/00; A01K 1/02; A01K 1/0236; A01K 1/0272; A01K 1/0281; A01K 1/03; A01K 1/031; A01K 1/033; A01K 1/034
  See application file for complete search history.

(56) References Cited

U.S. PATENT DOCUMENTS

| 2,868,406 | A | 1/1959 | Kookogey |
| 3,048,147 | A | 8/1962 | McKean |
| 4,909,188 | A | 3/1990 | Tominaga |
| 2008/0245313 | A1* | 10/2008 | Jakubowski ......... A01K 1/0245 119/497 |
| 2009/0151226 | A1 | 6/2009 | Apps et al. |
| 2017/0359998 | A1* | 12/2017 | Kim ....................... A01K 1/033 |
| 2019/0029216 | A1* | 1/2019 | Volin ................... A01K 1/0107 |
| 2019/0239471 | A1* | 8/2019 | Polk ..................... A01K 1/0245 |

OTHER PUBLICATIONS

International Searching Authority, Notification of Transmittal of The International Search Report and The Written Opinion of The International Searching Authority, or The Declaration, International application No. PCT/IB2019/061265, dated May 25, 2020 (May 25, 2020); International filing date Dec. 23, 2019 (Dec. 23, 2019), Applilcant, FERPLASTS.P.A.

* cited by examiner

Primary Examiner — Joshua J Michener
Assistant Examiner — Nicole Paige MacCrate
(74) Attorney, Agent, or Firm — Orbit IP, LLP

(57) ABSTRACT

A modular frame expandable to form a pet's cage comprises a plurality of modules (20) each of which consists of a substantially quadrangular vertical wall, said modules being arranged adjacently to each other to define the outer shape of the cage, and wherein each vertical edge of each module comprises connecting elements adapted to allow the connection and retention of each vertical wall of a module to a vertical wall of another adjacent module. The modular frame is expandable on a horizontal plane according to a predetermined configuration to form a pet's cage having predetermined shape and dimensions.

16 Claims, 8 Drawing Sheets

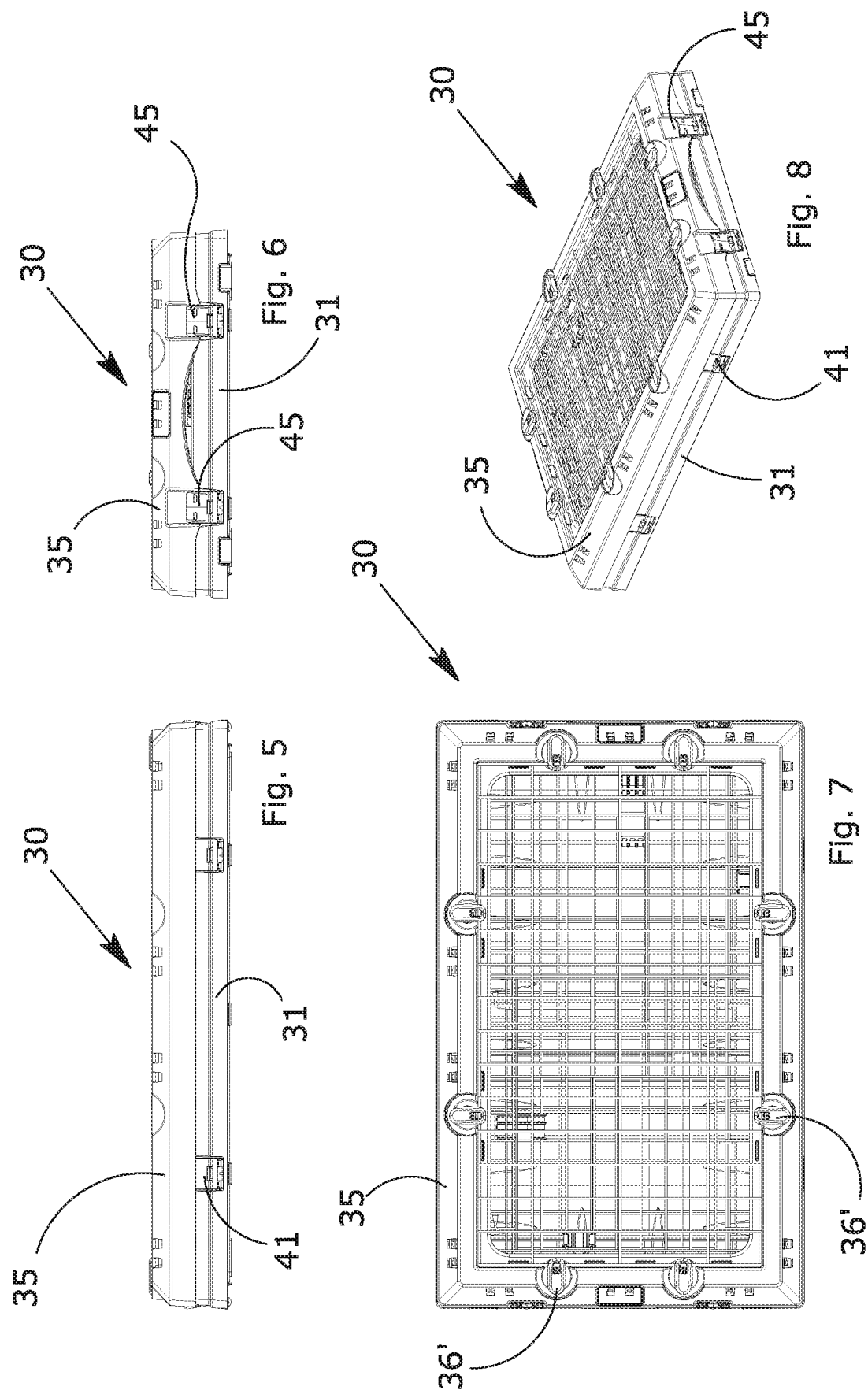

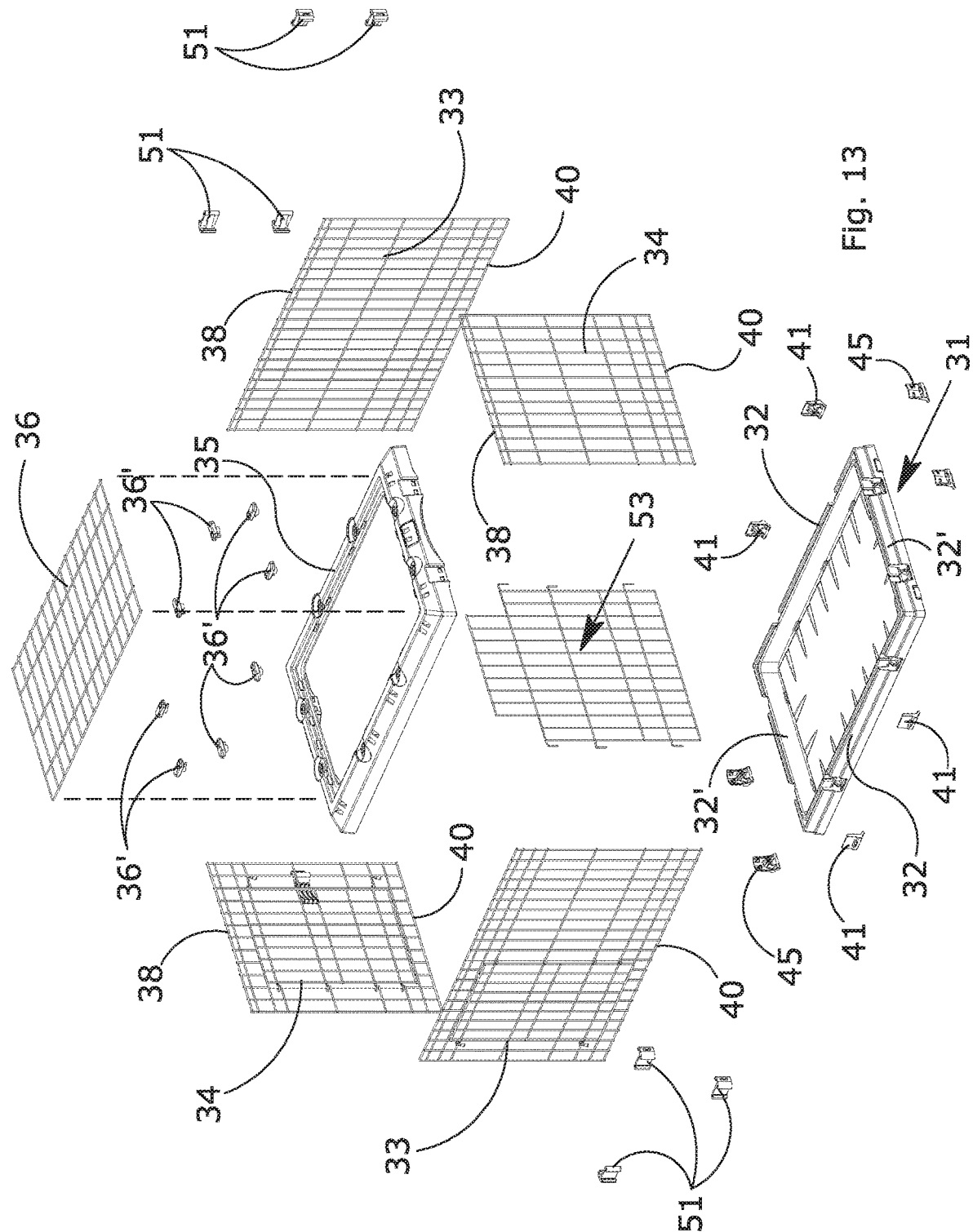

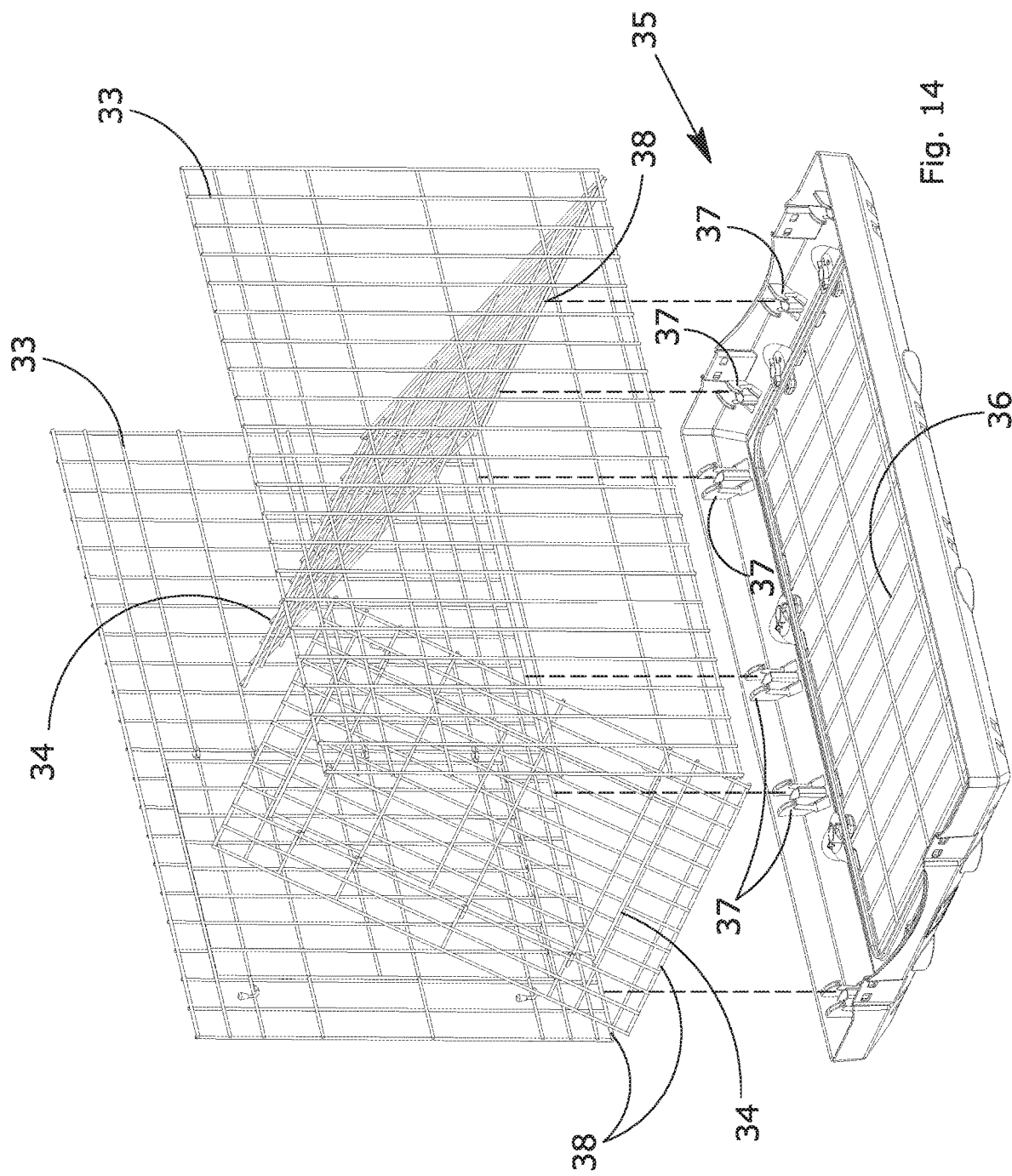

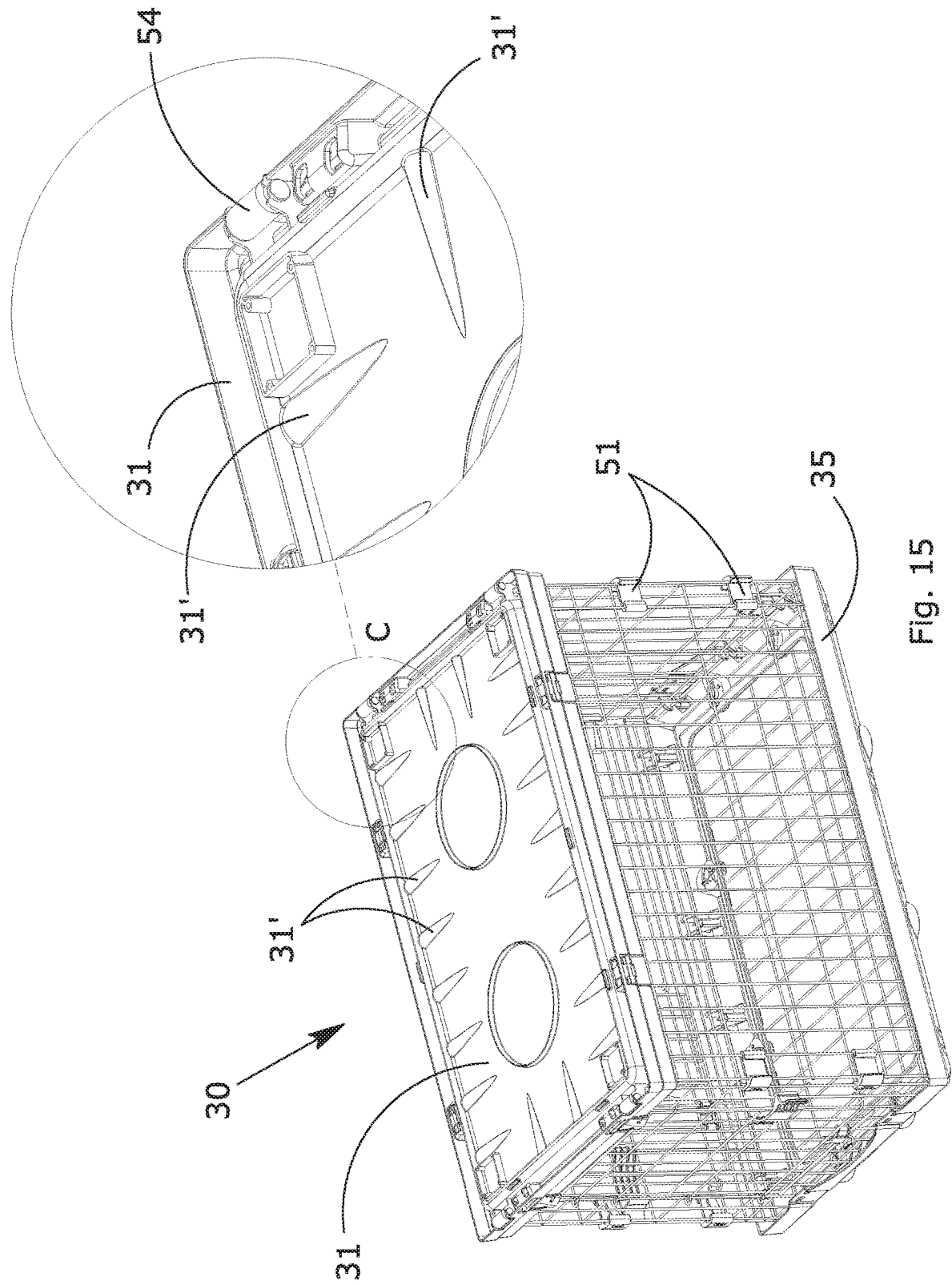

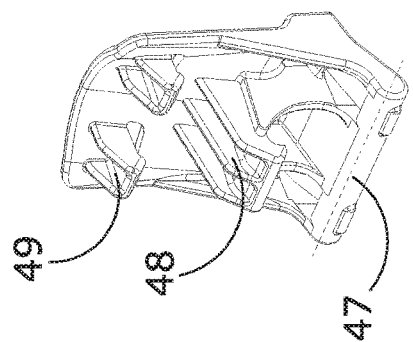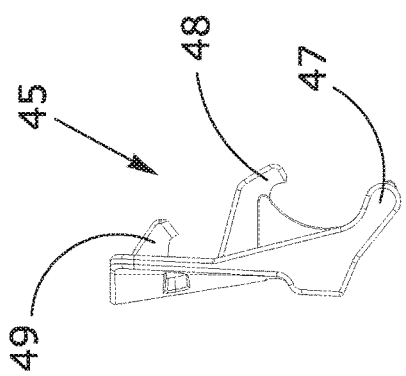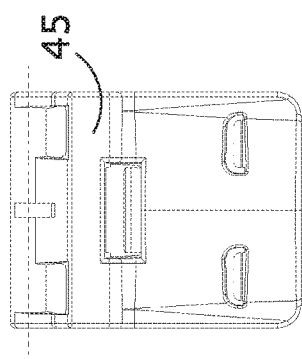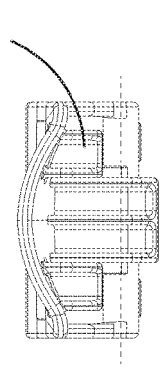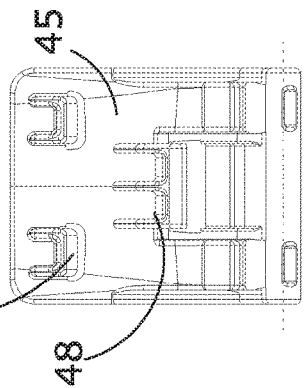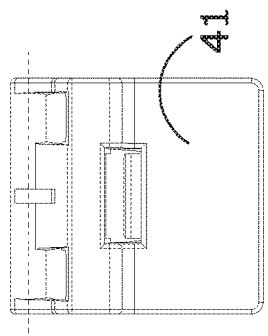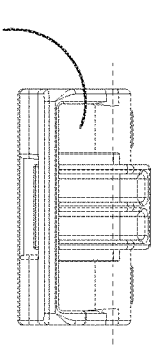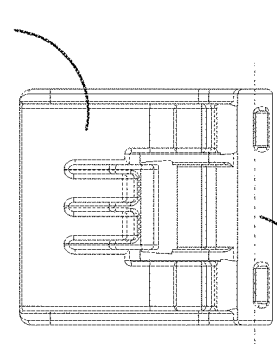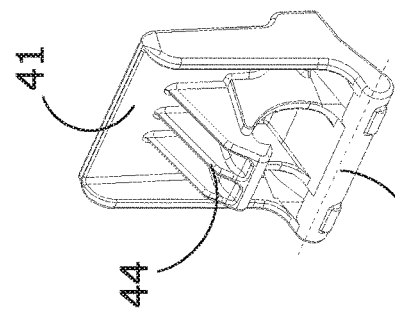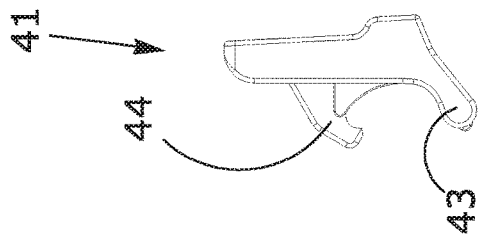

COLLAPSIBLE PET'S CRATE

CROSS-REFERENCE TO RELATED APPLICATIONS

This application is a continuation of International Application No. PCT/IB2019/061265, filed on Dec. 23, 2019.

TECHNICAL FIELD

The present invention relates to a collapsible crate used for the containment and transportation of pets, and in particular for dogs, cats, rabbits, or other animals, provided with a means which allows closure through folding.

The crate comprises a base, an upper roof and a plurality of vertical grilled walls that form a structure such as to allow the separation of the walls, which are hooked to the roof, from the base and the folding of the vertical walls towards the inside of the roof, so that the same can fit in the roof so that it can be lowered vertically and closed on the base while the walls remain disposed in an inner space between the roof and the base.

This allows drastically reducing the overall dimensions, allowing easy transportation and limited overall dimensions of the folded crate during phases of non-use.

The crate described herein has a number of advantages, including the ability of being collapsed to the combined thickness of its base and lid, so as to facilitate its transportation and storage, for example, in warehouses and points of sale.

The present invention is advantageously applied in the sector of components and accessories for pets, in particular in the sector of crates for the containment and transportation of pets such as dogs and cats.

BACKGROUND

The use of crates is known, represented by containment structures for pets consisting of a base, a roof and four vertical walls arranged perpendicularly side by side. Each of said components is made with different techniques, also based on use, but generally the vertical walls, as well as the base and the roof, are mostly made using horizontal and vertical metal wires which are spaced so as to form meshes or grills which prevent the passage of the contained animal.

Each of the mesh or grilled walls is generally maintained together with each of the others through the use of various joining systems, sometimes through electro-welding, or in other cases through the use of profiles that form a structure of uprights and crosspieces provided with the required balance.

In the most common cases the crate is made with mesh surfaces composed of grilled planes arranged in a parallelepiped with rigid joints, where the lower face can also be represented or associated with a base which is generally of the basin type, and the upper face can be represented or associated with a flat or shaped lid.

In other cases the crate is formed through the junction of walls which are in part mesh, i.e. grilled, and in part formed by planes or angles in continuous plastic material, i.e. without openings that make the product more aesthetically pleasing and allow a better junction between the vertical walls and the shaped horizontal trays that close the crate below and above.

All these embodiments are subject to a common drawback concerning their storage in warehouses and in points of sale or to their positioning when they are not in use. The drawback is even more evident in those cases where the crate is used for pets of large sizes, typically dogs of large dimensions, and in these cases it is very difficult to find the right location, i.e. the adequate space, for their positioning.

To solve these problems certain models of foldable crates have been proposed on the market, which perform their containment function only when they are in the open configuration, i.e. in use, while during non-use or storage they can be stowed in a small space with respect to the space occupied in the open configuration.

A solution of this type proposes that the crate comprises two opposite vertical walls divided in two parts, in the longitudinal direction, hinged to each other and also with respect to the lower and upper trays, so that the crate can close in a bellows manner until the junction between the upper tray and the lower one.

In this case the folding structure comprises a plurality of hinges which do not ensure the required reliability and offer rather limited reductions of space in the closing phase, precisely due to the presence of numerous hinges associated with bulky components to which they are coupled.

According to other solutions the crate comprises a framework in substantially plastic material formed by vertical and horizontal frames and angular profiles to obtain a parallelepiped structure, inside of which the grilled walls are arranged, retained inside suitable seats and profiles.

To fold this crate, it is necessary to disassemble the plastic components that form the profiles of the angular elements in multiple pieces, so as to release the grilled walls that can be subsequently placed overlapping. A drawback in this case is represented by the fact that the framework of plastic material must be completely disassembled into multiple pieces that are made through the use of several moulds, which affect the costs of both production and the finished product, not least creating manual operating difficulties which must be faced during both disassembly and reassembly.

Solutions have even been provided that envisage the use of a framework consisting of a plurality of metallic tubular elements mutually joined also through articulated joints so as to form in situ a parallelepiped structure, which is then covered with special pre-shaped canvases, using a principle similar to that of a camping tent.

This solution is not very practical because the assembly and disassembly phases entail a certain manual dexterity and moreover once completely assembled, the final structure is rather unstable due to the presence of the walls and base made of canvas, which walls and base lack a solid structure for support and containment, bearing in mind that this crate must be designed to also contain a pet of large dimensions.

Finally, solutions have also been provided that envisage arranging six grilled panels which when assembled together form a parallelepiped structure maintained in the use conformation through the use of suitable removable angular pieces arranged at the angular corners of the crate.

In this case the constructive method of the crate does not guarantee the required balance since the angular pieces only retain the angular corners, leaving the linear corner parts free, at the expense of the solidity of the structure.

More in general, the traditional folding crates do not provide such arrangements as to allow an easy removal of the base with respect to the vertical walls and the lid, and since the base remains constrained to the remaining part of the crate, it is not possible to properly clean it.

For this reason, it has sometimes been necessary to add an extractable drawer that, besides increasing the difficulty of cleaning, also increases the cost of the finished product.

SUMMARY

The present invention aims to provide a pet's crate made with a collapsible configuration so as to optimize space in both storage areas and in phases of non-use, thus creating a condition able to eliminate or at least reduce the above mentioned drawbacks.

The invention aims in particular to provide a collapsible pet's crate which comprises shaped vertical mesh walls mounted with hinges on a lid or roof made with a frame advantageously of plastic material, which can rest at the bottom on a base which is also advantageously made of plastic material.

The vertical walls are joined to the lid or roof through suitable hinges, which allow the folding of the walls inside the same lid, which can in this way be associated with the base with a clear limitation of the volume occupied.

In use, the grilled vertical walls can be unfolded from the lid or roof and vertically arranged, allowing them to penetrate between the edges of the base, to which they remain attached by means of suitable connectors.

The collapsible pet's crate according to one embodiment may have the features described at claim 1.

The dependent claims delineate further advantageous embodiments of the invention.

The mesh walls are mounted through hinges to the lid of the crate so as to be foldable inwards and remain inside the perimeter of the lid when it is arranged in the closed position.

The use of a series of quick-closing hooking means is further provided, arranged at the edges of the base, which allow the hooking between the base and the lower edges of the vertical walls which are introduced inside the edges of the base itself.

Feet are also provided according to an embodiment of the invention, which can be used to raise the crate from the ground to create an air passage and to prevent the formation of moisture.

One of the advantages offered by the invention is given by the fact that the folding system envisages that the first operation is the removal of the base from the remaining part of the crate, making it easy to clean, which is the first operation to be carried out when the crate must be folded.

Accessories are further provided such as wheels arranged on the bottom which allow being able to drag the crate like a trolley, as are quick couplers provided, which allow fixing also swivelling wheels to the bottom of the base to facilitate the movement of the folded crate in the closed position.

ILLUSTRATION OF THE DRAWINGS

Further characteristics and advantages of the invention will become apparent from reading the following description of an embodiment of the invention provided by way of non-limiting example, with the aid of the figures illustrated in the appended tables of drawings, in which:

FIGS. 5 to 8 show views of the crate according to the invention as a whole in its closed configuration, in which it assumes the shape of an easily transportable suitcase;

FIG. 13 shows a view of the crate according to the invention with its components exploded;

FIG. 14 shows a schematic view of the crate according to the invention with the lid overturned and the vertical walls detached from the same lid, two of which are inclined, i.e. in the step of folding towards the inside;

FIG. 15 shows a schematic view of the crate overturned, i.e. with the lower base arranged at the top;

FIGS. 16 to 20 show schematic views according to different angles of a first hooking element that allows the fixing of the vertical mesh walls to the base, which is arranged at the long sides of the base of the crate;

FIGS. 21 to 25 show schematic views of a second hooking element that determines the fixing of the vertical mesh walls to the base, arranged at the short sides of the base of the crate;

DESCRIPTION OF AN EMBODIMENT OF THE INVENTION

Figure 1:
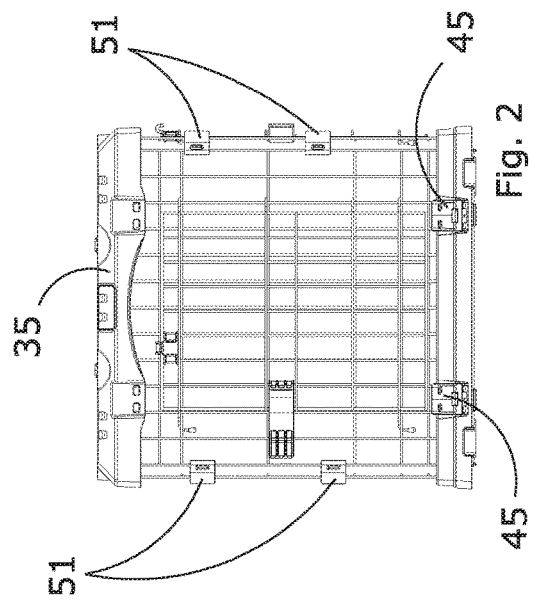
FIGS. 1 to 4 show schematic views of the crate according to the invention as a whole, assembled and in a use position, respectively of the front, side, from above and in an axonometric perspective.
Figure 2:
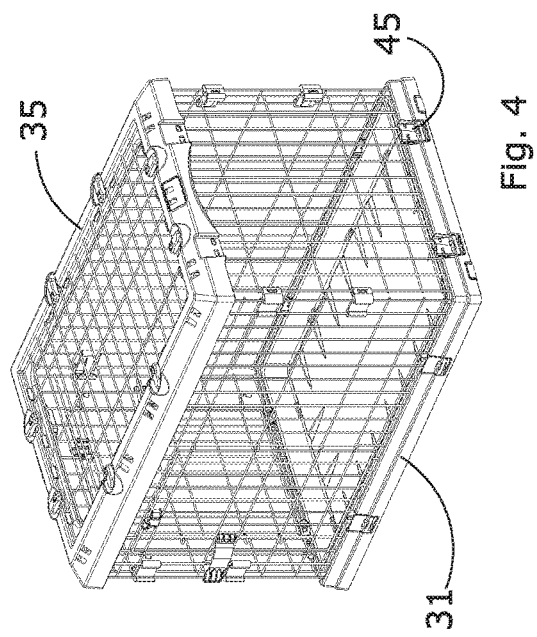
Figure 3:
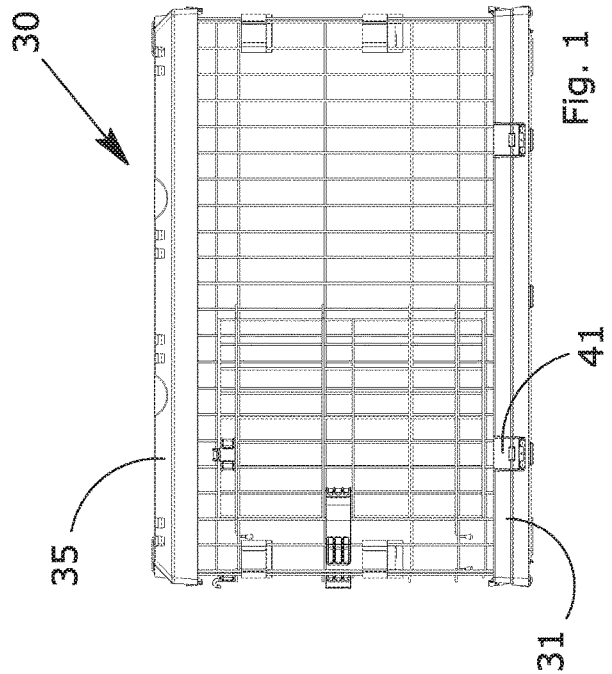

With reference to the appended figures, and initially in particular FIG. 1, the reference number 30 denotes in its entirety a pet's crate, typically for dogs.

Figure 26:
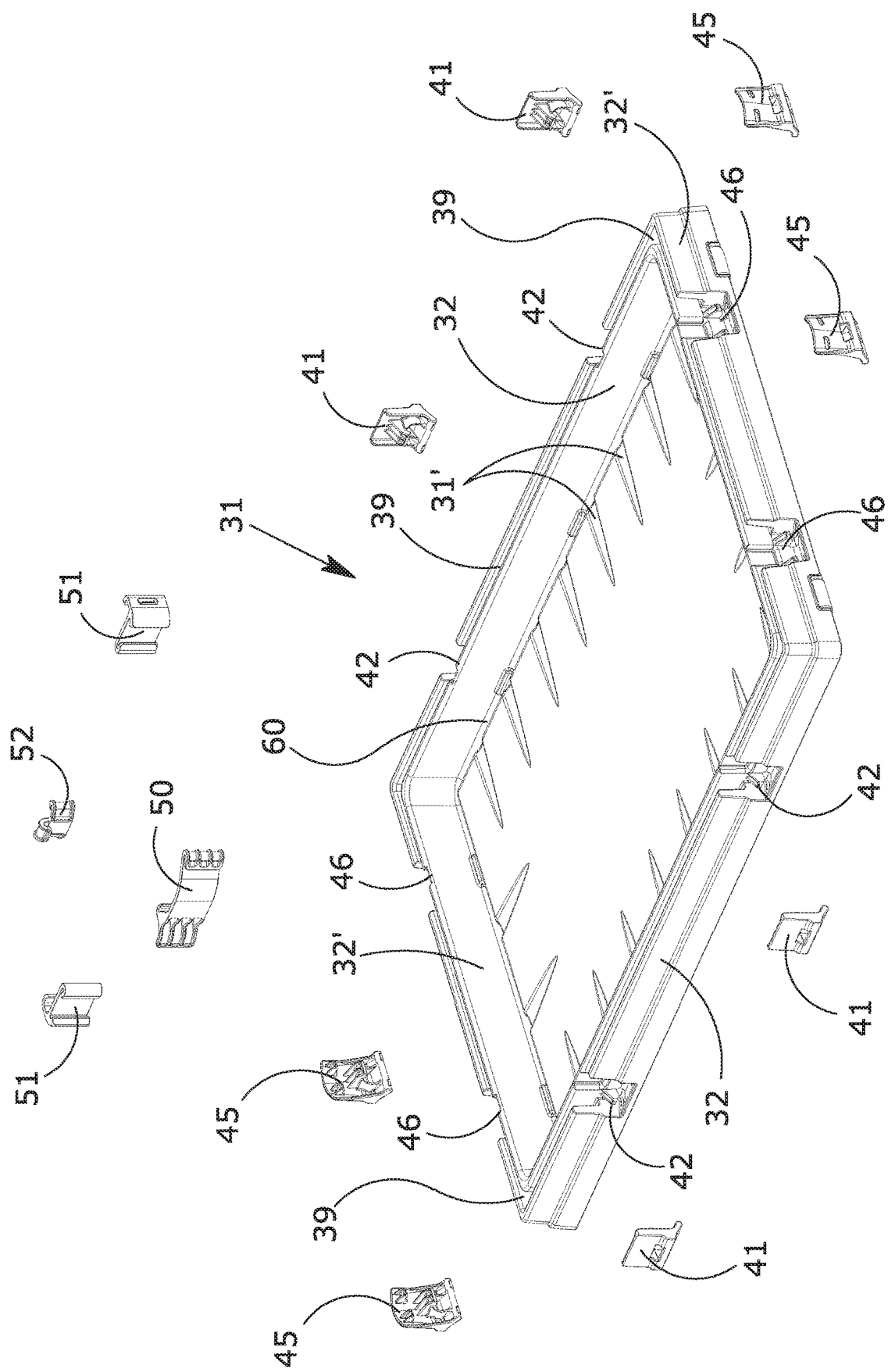
FIG. 26 shows an axonometric view of the base and of the junction and fixing elements between the base and the mesh planes as well as the mutual junction between the mesh planes themselves.

According to the embodiment illustrated in figures from 1 to 4 and in the exploded views of FIGS. 13 and 26, the crate according to the invention comprises:

a) a base 31 having a substantially quadrilateral shape, more preferably rectangular, comprising a quadrilateral tray provided, on the four sides, with a frame formed by profiles 32 and 32', the first of a greater length than the second, placed elevated with respect to the base tray;

b) a lid or roof 35, in a single body or possibly comprising a frame associated with a mesh plane 36.

c) a plurality of larger vertical grills 33 and of smaller vertical grills 34, in electro-welded mesh or the like, where the pairs of larger grills 33 and smaller grills 34 facing each other are associable with the larger profiles 32 and smaller profiles 32' of the base;

As shown in FIG. 13, in the case in which the lid or roof 35 is configured with the use of a frame associated with a mesh plane 36, it is envisaged that this mesh plane 36 can be hooked to the frame using suitable removable clasps 36'.

This allows, by removing some of the removable clasps 36', the lid or roof to be opened completely or like a book according to requirements, so as to be able to access the inside of the crate to carry out maintenance operations or to use as a convenient access to the animal closed in the crate.

According to the embodiment shown in FIG. 14, which shows the lid 35 in an overturned position and the mesh grills 33 and 34 detached from the lid or roof and partially in the closing phase, the inner part of each edge of the lid or roof is provided with hooking elements 37 for the retention, with the possibility of rotation, of the mesh grills 33 and 34 and more precisely for the retention, with the possibility of rotation, of the mesh grills 33 and 34 on the axis of an upper crosspiece 38 of the grill facing the lid or roof and arranged parallel to the edge of the same.

According to the embodiment shown in FIGS. 13 and 26, the profiles 32 and 32' forming part of the frame of the base 31, which have a very strong structure to withstand also strong thrusts imparted by the animal contained therein, and comprise a groove 39 afforded along the entire perimeter of the frame itself, said groove being designed to accommodate a lower crosspiece 40 of each mesh grill opposite to the aforementioned upper crosspiece 38 of the grill facing the lid or roof, and also arranged parallel to the edge of the same.

According to the embodiment shown in FIG. 26, on the bottom of the base 31 transversal slits 31' are afforded with grooves of increasing depth towards the inner edge where a perimeter channel 60 is disposed. The transversal slits 31' connected to the perimeter channel 60 allow the drainage toward the inner edge of the base of any droppings of the animal, thereby maintaining the tray of the base clean.

The crate also comprises shaped hooking elements for mutually retaining the components described above.

In particular, as shown in FIG. 26, and from 16 to 20, the use of first hooking elements 41 is provided, designed to be inserted and retained with the possibility of rotation in respective seats 42 afforded on the larger profiles 32 of the base, as they are provided with a rim 43 adapted to be inserted rotatably in a respective cavity of the seats 42 themselves. Said hooking elements 41, as visible in FIG. 19, comprise a nose-shaped projection 44 which determines the hooking on the lower crosspiece 40 of each larger grill 33 inserted in the groove 39.

Second hooking elements 45 are similarly provided, shown in FIGS. 21 to 25, designed to be inserted and retained with the possibility of rotation in respective seats 46 afforded on the short sides 32' of the base, as they are provided with a rim 47 adapted to be inserted rotatably in a respective cavity of the seats 46 themselves, which, as can be seen in FIG. 25, comprise a nose-shaped projection 48 which determines the hooking and retention of the lower crosspiece 40 of each grill 34 inserted in the groove 39, and a further nose-shaped projection 49 which determines the hooking of the smaller profile 32' of the base with the edge of the lid when these two components are packed together in a closed crate configuration.

Finally as shown in FIG. 26, hooking elements 50, and 52 are provided, designed to constrain further components of the mesh grills.

In further detail, as shown in FIGS. 13 and 26, the use of hooking elements 51 is provided, adapted to mutually constrain the mesh grills 33 and 34 at their corners, giving the required balance to the crate and the perfect retention therebetween of the grills at the joined corners. This system also prevents the animal from splaying the grills by bending them.

The hooking elements 51 also make manipulating the disassembled crate more stable, especially when it must be engaged on the base.

According to the embodiment shown in FIG. 13, the crate according to the invention can comprise an accessory represented by a mesh grill 53 arranged vertically, which represents a partition, with an adjustable positioning, of the inner compartments of the crate itself, in order to limit the inner space for the training of the animal.

Figure 4:
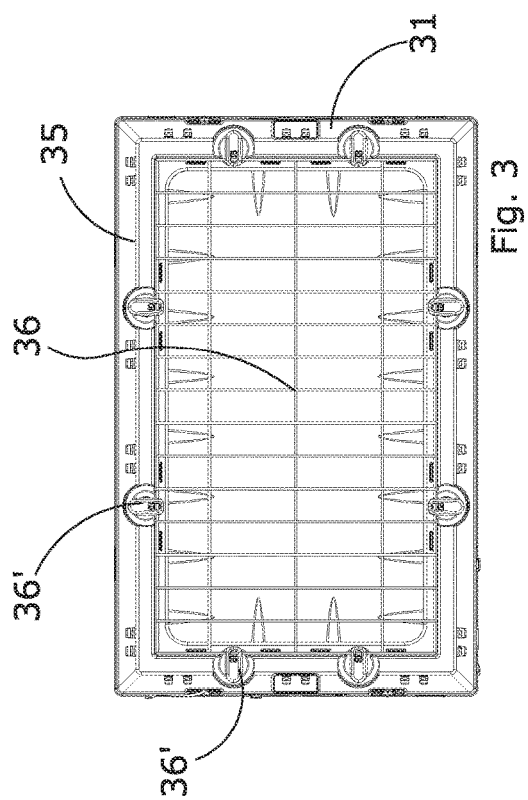
Figure 10:
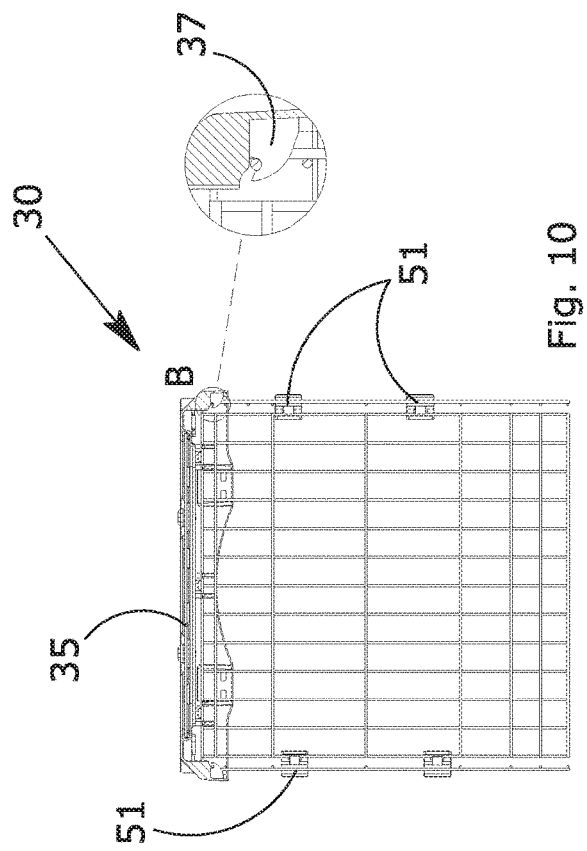
FIG. 10 shows a schematic side view of the crate according to the invention along the line of section A-A of FIG. 9.
Figure 12:
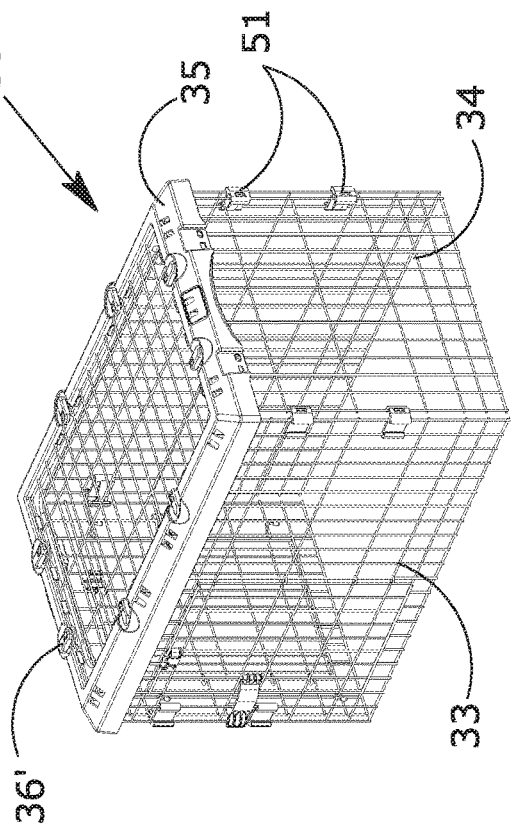
FIGS. 11 and 12 are schematic views of the crate according to the invention, respectively taken from above and in an axonometric perspective.
Figure 9:
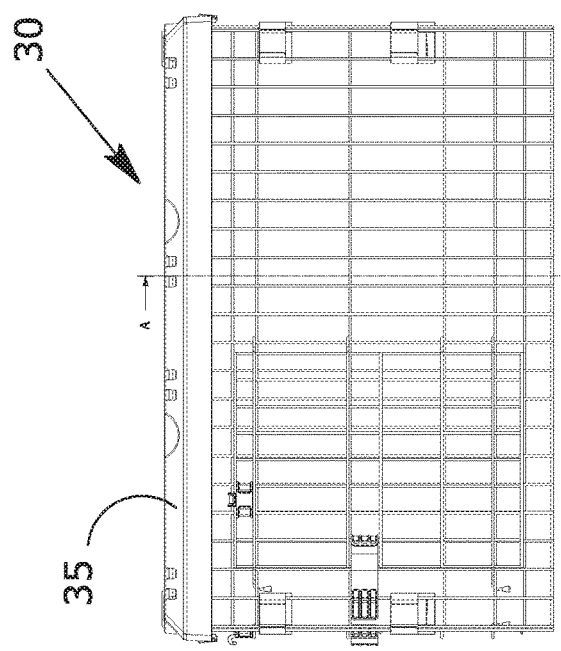
FIG. 9 shows a front view of the crate in a configuration without the base, i.e. with only the vertical mesh walls associated with the lid.
Figure 11:
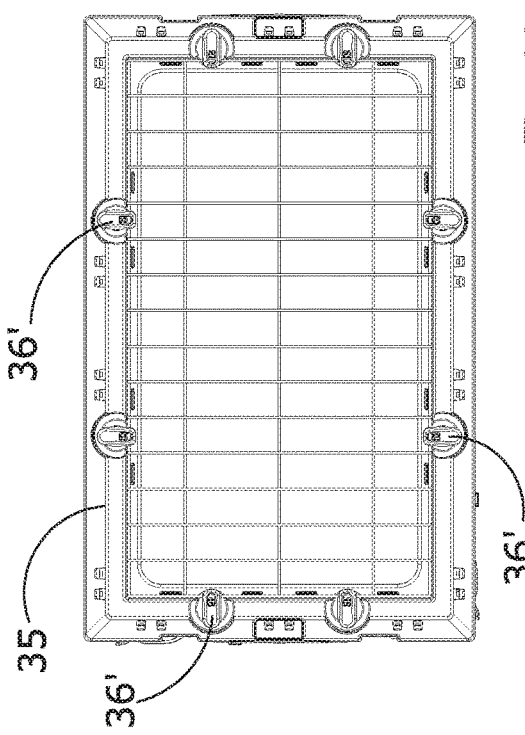

From an operational point of view the crate 30 according to the invention has an erected and operational configuration to accommodate a pet, as visible in FIG. 4, where the perimeter mesh grills are arranged vertically with respect to the lid and are hooked to the base and locked in position by the hooking elements 41, 45 so as to obtain a solid and stable structure.

To obtain the folding of the crate, it is sufficient to release the hooking elements 41 and 45 from the mesh grills and overturn the lid or roof 35 to which the grills are applied, in order to allow a 90° rotation of the grills towards the inside of the lid to obtain an overlapping of grills which remain contained within the inner space beneath the lid.

At this point it is possible to overlap the base 31 on the lid 35 in order to obtain the configuration of FIG. 8, which, as can be seen, is extremely compact and occupies very limited overall dimensions.

According to further embodiments, accessories are further provided such as wheels 54 arranged on the bottom of the base, as illustrated in detail "C" of FIG. 15, which allow being able to drag the crate like a trolley, as are quick couplers provided which allow fixing of swivelling wheels to the bottom of the base which facilitate the movement of the folded crate in the closed position.

It is also envisaged that suitable lifting feet can be introduced to the lower part of the bottom of the base that allow partially raising the crate to leave a gap between the base and the supporting floor of the crate.

This allows avoiding or at least limiting the formation of moisture inside the crate itself due to the difference in temperature between the base of the crate heated by the animal and the cold floor.

The conception of the crate according to the invention, in which the vertical walls are hooked to the upper lid, allows, after opening the hooks 45 which release the constraints of the base of the two opposite mesh grills 34 of smaller dimensions, the crate itself to be opened by lifting the lid that carries with it all the mesh grills 33 and 34, leaving the base free and ready to be cleaned of droppings, allowing convenient cleaning.

The invention claimed is:

1. A collapsible pet's crate comprising:
   a) a base tray having a quadrilateral shape and provided, on the four sides, with a frame formed by profiles, placed substantially perpendicular with respect to the base tray;
   b) a lid, having dimensions corresponding to said base and provided with four respective edges defining an inner space beneath the lid;
   c) four mesh grills rotatably joined to the edges of the lid;
   wherein each edge of the lid comprises first hooking elements hinged to a first upper crosspiece of a respective mesh grill so as to allow rotation of the respective mesh grill about a lengthwise axis of the first upper crosspiece; and
   wherein each profile of the base tray defines a groove configured to accommodate a lower crosspiece of a respective mesh grill and to releasably retain it therein through second hooking elements,
   whereby the crate is configured to have a first erected state in which the respective mesh grills are set substantially vertically and the lower crosspiece of each grill is joined to a corresponding profile of the base tray, and a second collapsed state in which the respective mesh grills are rotated inwardly substantially by 90° about the lengthwise axis of the first upper crosspiece and are parallel to a planar surface of the lid and are accommodated inside the inner space, and whereby the base tray and the lid are joined to each other with the mesh grills stowed in a horizontal position therebetween.

2. The crate of claim 1, wherein each of the second hooking elements comprises
   a rim that is inserted in a seat disposed on a side of the base tray.

3. The crate of claim 1, wherein it comprises a further mesh grill arranged vertically within the crate to form a partition with adjustable positioning, so as to permit adjustment of inner compartments of the crate.

4. The crate of claim 1, wherein the lid comprises a frame associated with another mesh grill connected to the frame by means of removable clasps.

5. The crate of claim 1, wherein each of the second hooking elements comprises a nose-shaped projection for hooking the lower crosspiece of a mesh grill which is inserted in the groove.

6. The crate of claim 5, wherein at least some of the second hooking elements comprise a further nose-shaped projection to hook an edge of the base with an edge of the lid when the crate is in a collapsed configuration.

7. The crate of claim 1, wherein the base tray comprises transversal slits formed by grooves of increasing depth directed towards an inner edge of the base tray comprising a perimeter channel.

8. The crate of claim 1, wherein it further comprises third hooking elements configured to mutually constrain the mesh grills at the crate's corners when the crate is in the first erected state.

9. A collapsible pet's crate comprising:
   a) a quadrilateral, horizontal base having a frame including an upwardly-projecting portion;
   b) a quadrilateral, horizontal lid; and
   c) four walls, each wall having an upper edge, a lower edge, and a pair of side edges, each wall being inwardly-rotatably hinged at its upper edge to the lid by one or more hooks, and each wall being releasably attachable at its lower edge to the base;
wherein a pet crate interior space is defined between the base, the lid, and the walls when the walls are positioned vertically and the lower edges of the walls are attached to the base, and wherein a collapsed pet crate is formed by the base, the lid, and the walls when the lower edges of the walls are detached from the base and the walls are rotated inwardly and upwardly to a horizontal position between the base and the lid.

10. A method for handling a collapsible pet's crate comprising providing a base tray having a quadrilateral shape and provided, on the four sides, with a frame formed by profiles placed substantially perpendicular with respect to the base tray; providing a lid having dimensions corresponding to said base and provided with four respective edges defining an inner space beneath the lid; providing four respective mesh grills rotatably joined to the edges of the lid between a first, erected position where the respective mesh grills are substantially vertical and a lower crosspiece of each respective mesh grill is connected to the base tray, and a second, collapsed position where each respective mesh grill is rotated by substantially 90° about a lengthwise axis of an upper crosspiece thereof and are inserted into the inner space; and wherein, when the crate is transitioned from the erected position to the collapsed position, the lower crosspieces of the respective mesh grills are disconnected from the profiles of the base tray, the lid and the mesh grills connected thereto are reversed and the mesh grills are rotated inwardly by substantially 90° so as to allow the mesh grills to be inserted into the inner space, and the base tray profiles and the edges of the lid are connected to each other in order to form a collapsed crate.

11. The collapsible pet crate of claim 9, wherein each side edge of the walls is releasably connectable to a side edge of another wall.

12. The collapsible pet crate of claim 9, wherein the upwardly-projecting portion of the frame defines a groove configured to receive the lower edges of the walls.

13. The collapsible pet crate of claim 9, wherein each wall is releasably attachable to the base by one or more hooks.

14. The collapsible pet crate of claim 9, wherein the walls comprise mesh grills.

15. The collapsible pet crate of claim 9, wherein the lid comprises a mesh grill.

16. The collapsible pet crate of claim 9, wherein each hook comprises a nose-shaped projection.

\* \* \* \* \*